(12) United States Patent
Khan

(10) Patent No.: US 8,082,471 B2
(45) Date of Patent: Dec. 20, 2011

(54) SELF HEALING SOFTWARE

(75) Inventor: Abid A Khan, Lucknow (IN)

(73) Assignee: Microsoft Corporation, Redmond, WA (US)

( * ) Notice: Subject to any disclaimer, the term of this patent is extended or adjusted under 35 U.S.C. 154(b) by 733 days.

(21) Appl. No.: 11/747,339

(22) Filed: May 11, 2007

(65) Prior Publication Data

US 2008/0282104 A1   Nov. 13, 2008

(51) Int. Cl.
*G06F 11/00* (2006.01)

(52) U.S. Cl. .......................................... 714/38.1; 714/48

(58) Field of Classification Search ................. 714/2, 38, 714/48, 38.1, 38.12, 38.13; 717/124, 125, 717/126
See application file for complete search history.

(56) References Cited

U.S. PATENT DOCUMENTS

| | | | |
|---|---|---|---|
| 6,023,586 A * | 2/2000 | Gaisford et al. | 717/178 |
| 7,366,714 B2 * | 4/2008 | Krachman | 707/3 |
| 2005/0144151 A1 * | 6/2005 | Fischman et al. | 706/45 |
| 2008/0005744 A1 * | 1/2008 | Buco et al. | 718/105 |

* cited by examiner

*Primary Examiner* — Dieu-Minh Le
(74) *Attorney, Agent, or Firm* — Lee & Hayes, PLLC

(57) ABSTRACT

The systems and methods describe a self healing framework (SHF) that can monitor errors in a computing system and can resolve the errors and/or suggest methods for resolving the errors to a user based on a heuristic approach. In addition, the SHF can analyze errors that occurred in the past and can predict such occurrences in the future to help users take proactive actions against possible errors.

14 Claims, 4 Drawing Sheets

SELF HEALING SOFTWARE

BACKGROUND

Software applications are provided in systems such as personal computers and computing devices. Such software applications and systems are typically created such that the systems can monitor execution of the applications using parameters related to performance, security, extensibility, error or exception handling, etc. Typically, there is an inherent lack of immunity and a defense mechanism in the systems that can allow the systems to not only monitor different types of errors, but to also take corrective actions as and when they occurs. Therefore, whenever a system encounters an error or exception in an application, an intervention by a user such as an information technology or IT administrator, product support personnel, may be required. This can result in an unfavorable end-user experience with the application, resulting in unplanned downtimes and higher ROI.

SUMMARY

This summary is provided to introduce simplified concepts of self healing software, described below in the Detailed Description. This summary is not intended to identify essential features of the claimed subject matter, nor is it intended for use in determining the scope of the claimed subject matter.

In an embodiment, a method is performed for self healing of software that includes monitoring errors, events, and exceptions occurring in program layers of the software, analyzing the monitored errors, events, and exceptions; and performing corrective actions to fix the analyzed errors, events, and exceptions.

BRIEF DESCRIPTION OF THE CONTENTS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

The following disclosure describes systems and methods for implementing self healing framework. The systems and methods describe a self healing framework (SHF) that monitors errors or exceptions in a computing system and either resolves the errors or exceptions and/or provides suggestions for resolving the errors or exceptions to a user. The user may then take appropriate action to troubleshoot the errors or exceptions. In addition, the SHF can analyze errors or exceptions that occurred in the past and predict occurrences in the future to help users take proactive actions against possible errors.

While aspects of described systems and methods for self healing software can be implemented in any number of different computing systems, environments, and/or configurations, embodiments are described in the context of the following exemplary system architectures.

Figure 1:
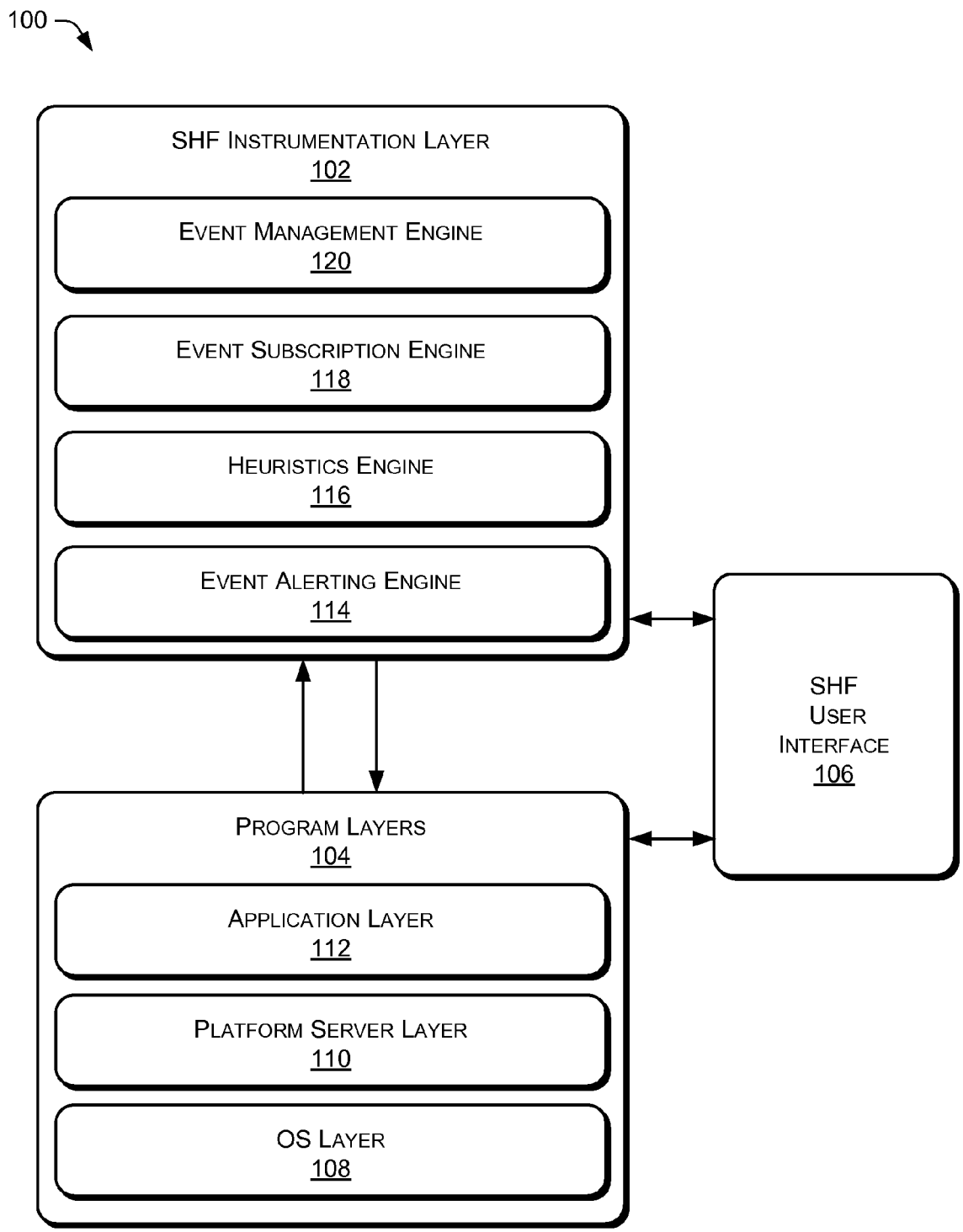
FIG. 1 illustrates exemplary self healing software architecture.

FIG. 1 illustrates an exemplary self healing software architecture 100 that includes a SHF instrumentation layer 102, which can be implemented as a background service in a system such as personal computer or other computing device. The SHF instrumentation layer may particularly be allocated in computer memory and as described below includes various data structures refereed to as "engines". The SHF instrumentation layer 102 monitors and parses errors, determines corrective actions that can be taken to fix the errors and generates reports once the corrective actions have been taken. For this, the SHF instrumentation layer 102 communicates with program layers 104 and a SHF user interface 106. The SHF user interface 106 can also directly communicate with the program layers 104.

The program layers 104 include an operating system (OS) layer 108, a platform or platform server layer 110, and an application layer 112. The OS layer 108 corresponds to execution of an operating system such as Microsoft® Windows®, UNIX, Microsoft® DOS, etc. In this example, the platform server layer 110 corresponds to operation of a server, such as a SQL server, an IIS web-server, etc. The application layer 112 corresponds to execution of various software applications which are using or interacting with layer 110

In operation, the SHF instrumentation layer 102 may use various engines or components to communicate with the program layers 104 and the SHF user interface 106. The SHF instrumentation layer 102 monitors error logs and event logs in the program layers 104. There may be different error and event logs for the operating system layer 108, the program server layer 110, and the application layer 112. For example, the SHF instrumentation layer 102 can communicate with applications, which track and log events, and expose subscriptions and notifications for different server systems such as database servers, email servers, and other application .NET Servers. An example of such an allocation is Windows Management Instrumentation (WMI) by the Microsoft® Corporation. The SHF instrumentation layer 102 can also communicate with application & system event logs to monitor errors such as server shutdown, service start or stop, etc.

An event alerting engine 114 in the SHF instrumentation layer 102 accesses information from the error or event logs, and generates alerts when pre-defined or subscribed errors or events, or their combinations, occur. The event alerting engine 114 can present the alerts to a user or application through the SHF user interface 106.

A heuristic engine 116 receives information from the SHF instrumentation layer 102 regarding the occurrence of the identified events, errors and exceptions. The heuristic engine 116 includes information such as rules declaring for which errors and events corrective actions may be required, what actions are to be taken for which type of events and errors, etc. Some of the rules in the heuristic engine 116 may be applicable for multiple program layers, while others may be application specific.

The rules in the heuristic engine 116 may include pre-condition rules and post-condition rules. Pre-condition rules relate to monitoring and parsing the events and errors, and identifying the set of system conditions which indicate occurrence of errors. The errors may include database corruption errors, memory space availability errors, performance issues, etc. For example, for a database server, when "ASSERT", "EXCEPTION_ACCESS_VIOLATION" or other error occurs, this can be taken as a sign of possible inconsistency in the database system.

Post condition rules relate to corrective actions that can be taken when a pre-condition rule is satisfied, such as creating a memory dump, etc. For example, in a database server, when a corruption error is encountered, a "database consistency check" command may be executed. In another scenario for a database server when a memory error occurs or error which points to memory pressure, a "clear SQL procedure cache" command may be executed when conditions points to higher memory usage by Procedure cache or corresponding memory consumer.

The heuristic engine 116 may also proactively identify events and conditions occurring in the system that may cause or lead up to errors. For example, for a database server, when a symptoms of corruption is identified, then the heuristic engine 116 may identify a probable impending issue such as "Assert", "Access Violation", "Thread Hang", etc. In another example, if output of the database command shows "physical/logical allocation fragmentation" shows high fragmentation, then a potential impact on performance may be identified. In another example, if I/O warnings are logged in error or event log then a potential performance impact may be identified. Once the heuristic engine 116 proactively identifies events and conditions, the heuristic engine 116 can also take appropriate corrective actions based on defined rules to prevent occurrence of errors.

The rules in the heuristic engine 116 may be defined based on errors that occurred in the past and actions that were taken to correct the same. Further, the heuristic engine 116 may use an event subscription engine 118 to communicate with other trusted servers over network and update the rules. The network may include an intranet or the Internet, or a combination of the two or other networks.

The event subscription engine 118 interfaces with various servers on the network to establish trust relationships (i.e., trusted servers). The SHF instrumentation layer 102 shares information regarding error occurrences and rules with trusted servers to update the heuristics engine.

The SHF instrumentation layer 102 also includes an event management engine 120 that exposes application program interfaces (APIs) used by the other engines in the SHF instrumentation layer 102. The event management engine 120 can also act as a controller for various events, alerts, and heuristics handled by the SHF instrumentation layer 102.

Figure 2:
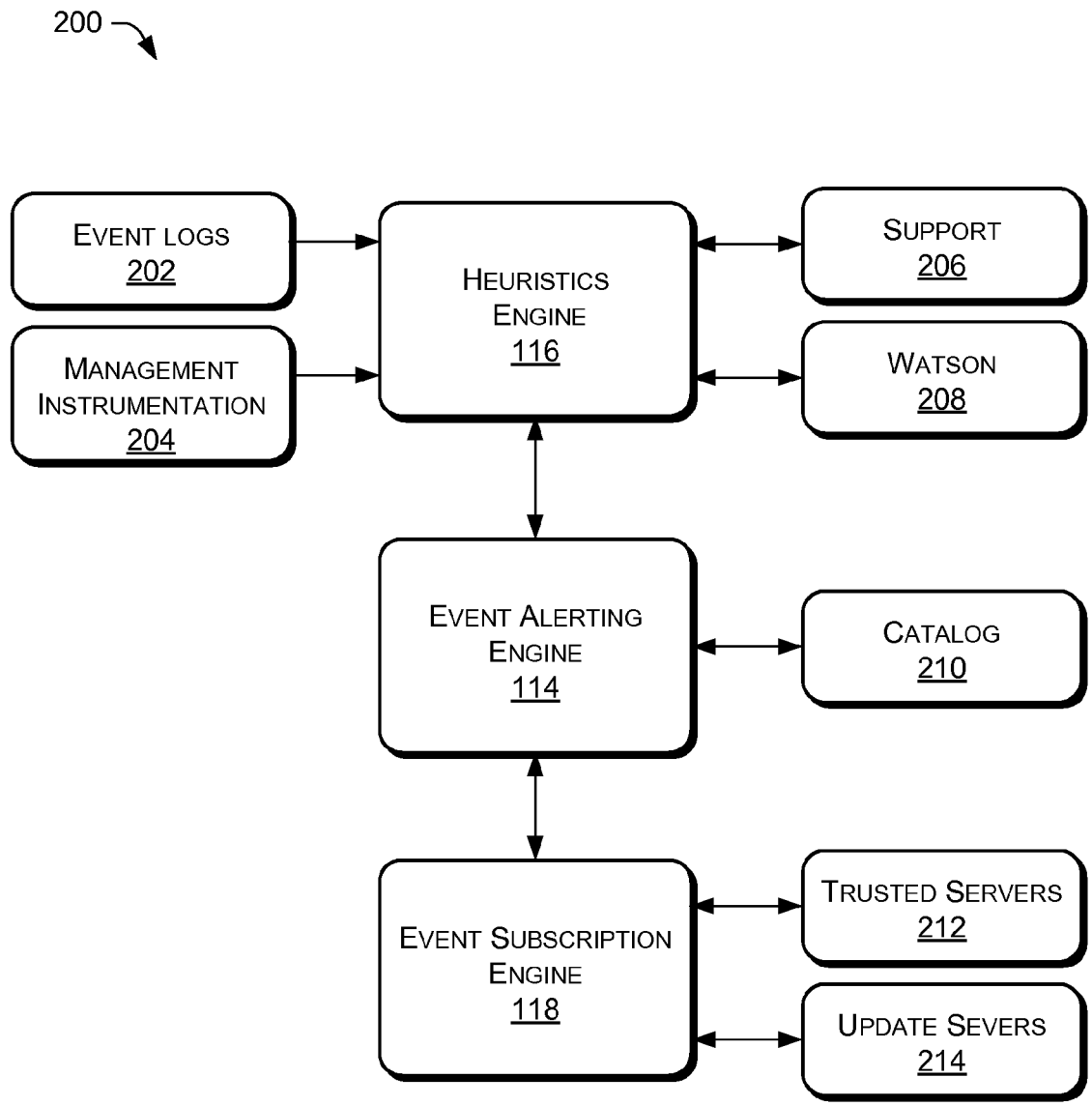
FIG. 2 is an exemplary dataflow diagram illustrating an implementation of self healing software.

FIG. 2 is an exemplary dataflow diagram 200 illustrating an implementation of self healing software. Dataflow diagram 200 is illustrated as a collection of blocks in a logical flow graph representing a sequence of operations that can be implemented in hardware, software, firmware or a combination thereof. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein.

In the context of software, the blocks can represent computer instructions that, when executed by one or more processors, perform the recited operations. For discussion purposes, the process 200 is described with reference to the environment 100 shown in FIG. 1.

In one implementation, the heuristic engine 116 monitors events per error logs such as event log 202 and management instrumentation 204. For example, management instrumentation 204 may be included in Microsoft Windows management instrumentation (WMI) by Microsoft® Corporation. The management instrumentation 204 alerts the heuristic engine 116 on the occurrence of an error or exception. For receiving such alerts, the heuristic engine 116 communicates with the various program layers 104.

The heuristic engine 116 includes a database that declares rules identifying corrective actions that can be taken for identified errors or events. The rules in the heuristic engine 116 can be pre-defined rules. The rules can also be generated whenever an error message is encountered. For example, the heuristic engine 116 may form rules based on information received from other troubleshooting applications such as a product support knowledge base (KB) 206 and a Microsoft Windows by Microsoft® Corporation Watson database (DB) 208. The rules declared in the heuristic engine 116 may be application specific, or may be applicable across applications, or may be a combination of the two.

For example, a heuristics engine 116 may include the following rules for a Microsoft SQL Server by Microsoft® Corporation executing in the platform server layer 110 over an OS layer 108.

---

1. For issues involving - 17803 errors:
    a. Check for Preceding Errors (Corruption Error, AV, ASSERT, Memory Error)
    b. If time difference between the 2 errors is under 5 min then execute the following command:
        GOTO <<Corruption Checks>>
    c. Check for Failed to Reserve Contiguous Memory.
    d. Check OS InUse/OS Committed and:
        Calculate x86 size of MTL
        Look into % of Connection, QueryPlan etc
    e. If Bpool issues then check Stolen and:
        Calculate x86 size
        Check AWE enabled
    f. Value of Corresponding Memory Managers
    g. Check syscacheobjects for pagesused
2. For issues involving AV errors:
    a. Preceding Errors (Corruption Error, AV, ASSERT, Memory Error)
    b. Capture (from sql errorlog) and analyze Call-stack.
    c. Check database consistency
3. For issues involving ASSERT errors:
    a. Preceding Errors (Corruption Error, AV, ASSERT, Memory Error)
    b. Capture (from sql errorlog) and analyze Call-stack.
    c. Check database consistency
4. For issues involving 17883 errors:
    a. Preceding Errors (Corruption Error, AV, ASSERT, Memory Error)
    b. Capture (from sql errorlog) and analyze Call-stack.
5. For issues involving LatchWarnings
    a. Preceding Errors (Corruption Error, AV, ASSERT, Memory Error)
    b. Check for Disk and I/O issues
6. For issues involving Slow Performance
    a. Preceding Errors (Corruption Error, AV, ASSERT, Memory Error)
    b. Check for Disk and I/O issues
    c. Check for I/O Warnings in SQL Logs
    d. Check for disk warnings in Event Logs
    e. Check for Stats Update
    f. Check for Indexes
    g. Identify queries with large Reads, Writes, CPU
    h. Check for high parallelism (based on sysprocesses..SPID)
    i. Query Trending and:
        Check for past Reads, Writes, CPU for a query
        Is current better or equal to past?
        Can query be tuned?
7. For issues involving Corruption Errors -
    a. Preceding Errors (Corruption Error, AV, ASSERT, Memory Error)
    b. Check for Disk and I/O issues by parsing System Event Logs
    c. Check database consistency by running DBCC CHECKDB
8. For issues involving OS/System Health Check from SQL Perspective
    a. If AWE enabled look for PAE patch
    b. Parse System Event Logs for BugCheck, Unexpected Shutdowns, Corruption warning

---

In operation, once the heuristic engine 116 identifies errors or events for which corrective actions are to be taken, the heuristic engine 116 interfaces with the event alerting engine 114 to notify a user regarding the identified errors or events, and the corrective actions to be taken. The event alerting engine 114 can notify the user through the SHF user interface 106. Once the corrective actions have been taken, the event alerting engine 114 can also provide a report to the user through the SHF user interface 106. The event alerting engine can 114 interface with a catalog 210 and the event subscription engine 118 to catalog information about the occurrence of events or errors, the corrective actions taken, and the results obtained.

The event subscription engine 118 establishes a trust relationship with servers over a network such as trusted servers 212 and update servers 214 to share the information with external servers. In addition, the event subscription engine 118 can also obtain the information from the trusted servers 212 and the update servers 214, to update the rules in the heuristic engine 116. Thus, the heuristic engine 116, the event alerting engine 114 and the event subscription engine 118 can track errors or events, and take corrective actions based on the rules, thereby minimizing intervention by a user (e.g., an IT administrator).

Figure 3:
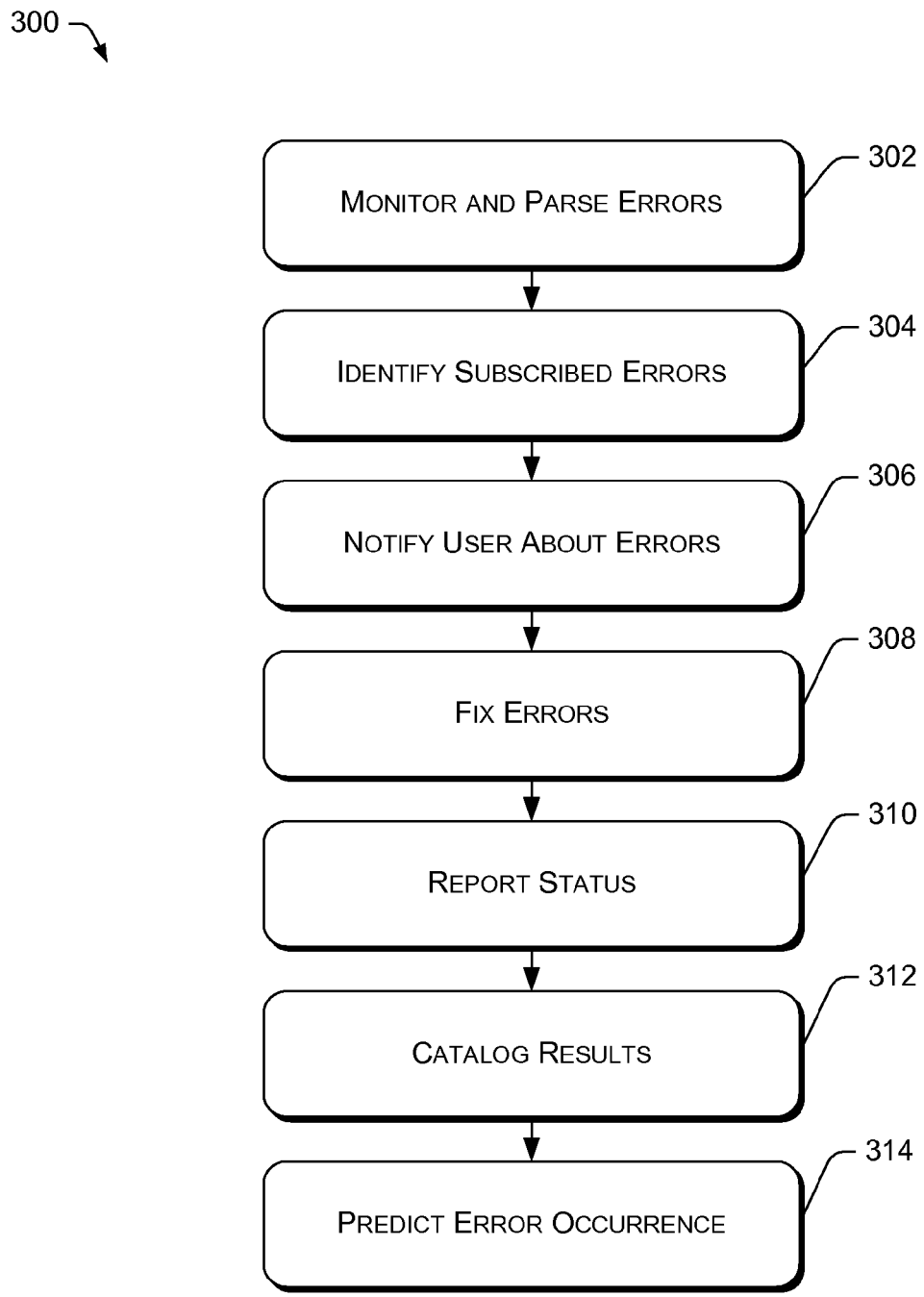
FIG. 3 illustrates an exemplary process for self healing of software.

FIG. 3 illustrates an exemplary process for self healing of software. Process 300 is illustrated as a collection of blocks in a logical flow graph representing a sequence of operations that can be implemented in hardware, software, firmware or a combination thereof. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein.

In the context of software, the blocks represent computer instructions that, when executed by one or more processors, perform the recited operations. For discussion purposes, the process 300 is described with reference to the environment 100 shown in FIG. 1, and the data flow diagram 200 shown in FIG. 2.

At block 302, various errors, events and exceptions that occur in the program layers 104 are monitored and parsed. The error, events and exceptions may be monitored using management instrumentation 204 and event logs 202, and may be parsed using product support Knowledge Base articles or 206, or other systems such as Watson database in Microsoft Windows by Microsoft® Corporation 208.

At block 304, the error messages and event logs are analyzed to identify occurrences of subscribed events or errors. The subscribed events and errors include those that are present in the heuristics engine 116, and those that are present in the catalog 210, the trusted servers 212, and the update servers 214. Various combinations of events may also analyzed to determine whether a health check is required. The health check may be triggered for a program layer 104. For example, when an increase or spike in CPU usage is recorded along with a drop in memory availability, a health check may be triggered in the operating system layer 108.

The heuristic engine 116 may create a restore point to save the pre-conditions or settings which existed before taking the corrective actions to. This allows a user (e.g., database administrator) to roll back the actions if so desired. Furthermore, a snapshot of the existing conditions may be saved, for example, tracking and noting changes e.g. "database server configuration", copying "database query/procedure cache", "application or system Startup parameters", etc.

At block 306, notification of subscribed events or errors is performed. The event alerting engine 114 may notify a user of the occurrences of the subscribed events or errors through the SHF user interface 106. The SHF user interface 106 can also inform the user of one or more corrective actions that will be taken by the SHF instrumentation layer 102. Alternatively, the SHF user interface 106 can provide a list of possible action steps for corrective or further diagnosis to the users to choose from.

At block 308, identified errors are fixed. The heuristic engine 116 takes one or more corrective actions to fix the identified errors. The heuristic engine 116 determines the corrective actions to be taken based on rules stored in the heuristic engine 116 and using information from the support system or support knowledge base 206 and the Watson database in Microsoft Windows by Microsoft® Corporation or Watson 208.

The heuristic engine 116 can also use information from the trusted servers 212, the update servers 214, the catalog 210, and other such repositories to determine corrective actions that may be taken. For example, the heuristic engine 116 may receive pre-condition information from an online product support services bug check database, which is the central repository of known issues. In another example, the heuristic engine 116 can check for new errors in the bug check database and get updates on the corrective actions that can be taken, such as capturing snapshots of the physical disk. For example, the snapshots can include time taken for average disk read, write, and/or transfer operations in light of a particular timed benchmark (e.g., a 15 millisecond benchmark).

The corrective actions can also include executing certain commands, storing outputs from some command executions, capturing certain file information, seeking information in a file, checking online if there is any update patch, etc. For example in a database server, the corrective actions may include changes to "database configuration", "clear procedure cache", "run database consistency checker" with Repair_Options", etc.

At block 310, a report or summary is created of the events and errors identified and the corrective actions taken. The event management engine 120 may create a report or summary of the events and errors identified and the corrective actions taken. Further, the report can also include whether the corrective actions were successful in eliminating the errors. For example, in Microsoft SQL Server by Microsoft® Corporation a report may indicate that g384 was added to Microsoft SQL Server by Microsoft® Corporation startup as MTL pressure was identified based on DBCC MEMORYSTATUS output. In another example, a report may indicate that DBCC FREEPROCACHE was executed to clear up the proc cache as it was taking 60% of the pages from OS Memory Manager.

At block 312, the report of block 310 maybe stored or catalogued. In an example, the report is stored in the catalog 210, and presented to a user through the SHF user interface 106. The report may also be made available for sharing with the trusted servers 212.

At block 314, occurrences of errors may be predicted. For example, the SHF instrumentation layer 102 predicts occurrences of errors based on existing and monitored events in the past. The SHF instrumentation layer 102 can then suggest and or take pro-active actions to avoid the occurrence of those errors. The SHF instrumentation layer 102 may predict that when a patch is applied to the system and certain other conditions occur simultaneously, then an error or exception may occur based on past trending data for the system. In another example, the SHF instrumentation layer 102 may predict that when database re-indexing is performed, database transaction Log File Full error may occur due to lack of database transaction log file space.

Exemplary Computer Environment

Figure 4:
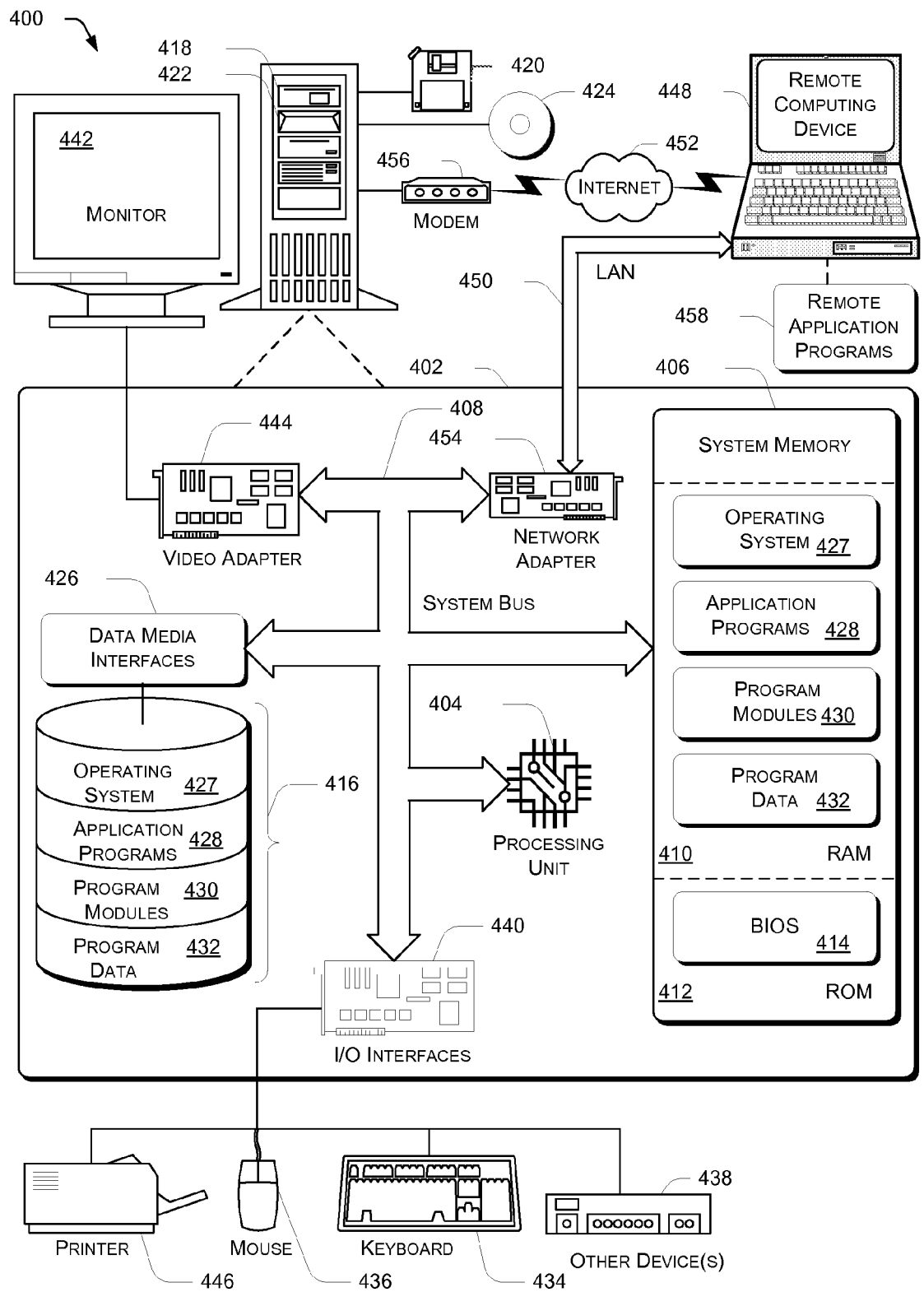
FIG. 4 illustrates an exemplary computing environment.

FIG. 4 illustrates an exemplary general computer environment 400, which can be used to implement the techniques described herein, and which may be representative, in whole or in part, of elements described herein. The computer environment 400 is only one example of a computing environment and is not intended to suggest any limitation as to the scope of use or functionality of the computer and network architectures. Neither should the computer environment 400 be interpreted as having any dependency or requirement relating to any one or combination of components illustrated in the example computer environment 400.

Computer environment 400 includes a general-purpose computing-based device in the form of a computer 402. Computer 402 can be, for example, a desktop computer, a handheld computer, a notebook or laptop computer, a server computer, a game console, and so on. The components of computer 402 can include, but are not limited to, one or more processors or processing units 404, a system memory 406, and a system bus 408 that couples various system components including the processor 404 to the system memory 406.

The system bus 408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 4 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 426. Alternately, the hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 416, magnetic disk 420, optical disk 424, ROM 412, and/or RAM 410, including by way of example, an operating system 427, one or more application programs 428, other program modules 430, and program data 432. Each of such operating system 427, one or more application programs 428, other program modules 430, and program data 432 (or some combination thereof) may implement all or part of the resident components that support the distributed file system.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing-based device 448. By way of example, the remote computing-based device 448 can be a personal computer, portable computer, a server, a router, a network computer, a peer device or other common network node, and the like. The remote computing-based device 448 is illustrated as a portable computer that can include many or all of the elements and features described herein relative to computer 402.

Logical connections between computer 402 and the remote computer 448 are depicted as a local area network (LAN) 440 and a general wide area network (WAN) 442. Such networking environments are commonplace in offices, enterprise-wide computer networks, intranets, and the Internet.

When implemented in a LAN networking environment, the computer 402 is connected to a local network 440 via a network interface or adapter 444. When implemented in a WAN networking environment, the computer 402 typically includes a modem 446 or other means for establishing communications over the wide network 442. The modem 446, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs reside on a memory device of remote computer 448. For purposes of illustration, application programs and other executable program components such as the operating system are illustrated herein as discrete blocks, although it is recognized that such programs and components reside at various times in different storage components of the computing-based device 402, and executed by the data processor(s) of the computer.

Various modules and techniques may be described herein in the general context of computer-executable instructions, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Alternately, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

CONCLUSION

The above-described methods and system describe self healing software. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A computer device comprising:
   a processor;
   a memory configured to the processor, comprising:
      a self healing framework (SHF) instrumentation layer that monitors and parses, wherein the self healing instrumentation layer comprises:
         an event alerting engine that accesses information from error or event logs, and generates alerts when pre-defined errors occur;
         a heuristic engine that receives information from the SHF instrumentation layer regarding the occurrence of the identified errors; and
         an event management engine that exposes application program interfaces (APIs) used by the other engines in the SHF instrumentation layer.

2. The computer device of claim 1, wherein the event alerting engine presents alerts to a user through a SHF user interface.

3. The computer device of claim 1, wherein the heuristic engine includes rules declaring which errors and events that corrective actions may be required and actions to be taken for which type of events and errors.

4. The computer device of claim 3, wherein the rules include pre-condition rules and post-condition rules.

5. The computer device of claim 1, wherein the heuristic engine proactively identifies events and conditions that cause errors.

6. The computer device of claim 1 further comprising an event subscription engine that interfaces with servers to establish trust relationships, wherein the SHF instrumentation layer shares information regarding error occurrences and rules with servers established with by the event subscription engine.

7. A computer comprising:
   a processor;
   a memory configured to the processor, comprising:
      a heuristic engine component that monitors events per an event log communicating with a program layer for error alerts; and
      an event subscription engine that establishes trust relationships with various computers to provide such trusted computers error reports received by the heuristic engine and receive update rules applicable to the heuristic engine.

8. The computer of claim 7, wherein the heuristic engine includes a database that declares rules identifying corrective actions that are taken for identified errors.

9. The computer of claim 8, wherein the rules are based on information received from troubleshooting applications.

10. The computer of claim 8, wherein the rules are applicable to a particular application.

11. The computer of claim 8 further comprising an event alerting engine that notifies errors and identifies corrective actions that are taken.

12. A method comprising:
   under control of one or more processors configured with executable instructions,
      monitoring events per an event log communicating with a program layer for error alerts; and
      establishing trust relationships with various computers to provide such trusted computers error reports that are received and receive update rules applicable to the monitoring events.

13. The method of claim 12 further comprising identifying corrective actions for the identified errors.

14. The method of claim 13 further comprising creating a report of corrective actions that are performed.

* * * * *